(12) United States Patent
Kobayashi et al.

(10) Patent No.: US 12,483,286 B2
(45) Date of Patent: Nov. 25, 2025

(54) REINFORCEMENT LEARNING RECEIVER FRONT-END

(71) Applicant: Qorvo US, Inc., Greensboro, NC (US)

(72) Inventors: Kevin Wesley Kobayashi, Redondo Beach, CA (US); Paul Edward Gorday, West Palm Beach, FL (US); Charles Forrest Campbell, Dallas, TX (US); Gangadhar Burra, Fremont, CA (US)

(73) Assignee: Qorvo US, Inc., Greensboro, NC (US)

( * ) Notice: Subject to any disclaimer, the term of this patent is extended or adjusted under 35 U.S.C. 154(b) by 336 days.

(21) Appl. No.: 18/353,163

(22) Filed: Jul. 17, 2023

(65) Prior Publication Data

US 2024/0048166 A1   Feb. 8, 2024

Related U.S. Application Data

(60) Provisional application No. 63/483,820, filed on Feb. 8, 2023, provisional application No. 63/394,804, filed on Aug. 3, 2022.

(51) Int. Cl.
*H04B 1/10* (2006.01)
*H04B 1/06* (2006.01)
*H04B 1/12* (2006.01)

(52) U.S. Cl.
CPC ................... *H04B 1/123* (2013.01)

(58) Field of Classification Search
CPC ... H01B 1/06; H01B 1/10; H01B 1/12; H01B 1/123; H01B 2001/1054;

(Continued)

(56) References Cited

U.S. PATENT DOCUMENTS 8,447,260 B2 * 5/2013 Rofougaran ......... H04B 1/1607
455/343.1
8,665,022 B2   3/2014 Kobayashi
(Continued)

FOREIGN PATENT DOCUMENTS

WO   2021021843 A1   2/2021

OTHER PUBLICATIONS

Giarola, A. J. "A Review of the Theory, Characteristics, and Operation of Frequency Selective Limiters," Proceedings of the IEEE, vol. 67, No. 10, Oct. 1979, pp. 1380-1396.
(Continued)

*Primary Examiner* — Quochien B Vuong
(74) *Attorney, Agent, or Firm* — Withrow & Terranova, P.L.L.C.

(57) ABSTRACT

A reinforcement learning receiver front-end (RL-RXFE) is disclosed having a low-noise amplifier (LNA) with adjustable supply voltage and adjustable bias voltages, a frequency selective limiter (FSL) coupled to the LNA and configured to attenuate undesired radio frequency (RF) bands and for sensing RF band power, and a combination of an analog-to-digital converter configured to convert an RF signal amplified by the LNA to a digital signal, a digital signal processor configured to generate spectrum information from the digital signal, and a baseband distortion by-product detector/sensor configured to generate distortion by-product information, and LNA dynamic information. A reinforcement learning processing circuitry receives and uses this information to perform reinforcement learning and to output control signals to the FSL and the LNA to maximize linearity and efficiency.

42 Claims, 4 Drawing Sheets

(58) Field of Classification Search
CPC .... H01B 2001/1072; H01B 1/14; H01B 1/16; H01B 1/1607; H03F 1/08; H03F 1/26; H03F 1/32; H03F 1/3205; H03F 3/189; H03F 3/19
See application file for complete search history.

(56) References Cited

U.S. PATENT DOCUMENTS

| | | | |
|---|---|---|---|
| 8,941,441 B2 * | 1/2015 | Testi | H03G 1/0088 330/306 |
| 9,929,701 B1 * | 3/2018 | Noori | H03F 3/195 |
| 11,032,014 B2 | 6/2021 | O'Shea et al. | |
| 11,245,427 B1 | 2/2022 | Campbell | |
| 2005/0164665 A1 | 7/2005 | Suganuma | |
| 2006/0291511 A1 | 12/2006 | Lan et al. | |
| 2012/0027141 A1 | 2/2012 | Petrovic et al. | |
| 2015/0105038 A1 | 4/2015 | Lascari et al. | |
| 2016/0211882 A1 | 7/2016 | Hwang et al. | |
| 2017/0160312 A1 | 6/2017 | Li et al. | |
| 2021/0013619 A1 | 1/2021 | Alkhateeb et al. | |
| 2021/0258988 A1 | 8/2021 | Balakrishnan et al. | |
| 2023/0023111 A1 * | 1/2023 | Balteanu | H03F 1/26 |

OTHER PUBLICATIONS

Guyette, A. C. "Theory and Design of Intrinsically Switched Multiplexers with Optimum Phase Linearity," IEEE Transactions in Microwave Theory and Techniques, vol. 61, No. 9, Sep. 2013, pp. 3254-3264.

Naglich, E. J., and A. C. Guyette. "Frequency Selective Limiters Utilizing Contiguous-Channel Double Multiplexer Topology," IEEE Transactions in Microwave Theory and Techniques, vol. 64, No. 9, Sep. 2016, pp. 2871-2882.

Quayle Action for U.S. Appl. No. 17/173,920, mailed Sep. 16, 2021, 12 pages.

Notice of Allowance for U.S. Appl. No. 17/173,920, mailed Oct. 4, 2021, 8 pages.

* cited by examiner

REINFORCEMENT LEARNING RECEIVER FRONT-END

RELATED APPLICATIONS

This application claims the benefit of provisional patent application Ser. No. 63/483,820, filed Feb. 8, 2023, and claims the benefit of provisional patent application Ser. No. 63/394,804, filed Aug. 3, 2022, the disclosures of which are hereby incorporated herein by reference in their entireties.

This application is related to U.S. Pat. No. 11,245,427, titled FREQUENCY SELECTIVE LIMITER, the disclosure of which is hereby incorporated herein by reference in its entirety.

FIELD OF THE DISCLOSURE

The present disclosure relates to a reinforcement learning receiver front-end architecture that is automatically adaptive to a changing operational environment.

BACKGROUND

A radio frequency (RF) receiver front-end (RF RXFE) is a section of an electronic device that contains components that allow it to receive signals from a radio frequency source. The RF RXFE is typically the first part of an RF receiver, and the RF RXFE includes components that allow the receiver to detect and process RF signals. The components of an RF RXFE generally include an antenna, a low-noise amplifier (LNA), a bandpass filter, and a mixer. Environmental conditions in which the RF RXFE operates may often degrade performance regarding linearity and efficiency. What is needed is an automated machine learning-type control system that maintains maximum linearity and maximum efficiency in real time.

SUMMARY

A reinforcement learning receiver front-end (RL-RXFE) is disclosed having a low-noise amplifier (LNA) with adjustable supply voltage and adjustable bias voltages and bias currents, a frequency selective limiter (FSL) coupled to the LNA and configured to attenuate undesired radio frequency (RF) bands and for sensing RF band power, a post-LNA variable gain/attenuator block configured for adjusting signal levels, followed by an analog-to-digital converter configured to convert an RF signal amplified by the LNA to a digital signal, a digital signal processor configured to generate spectrum information from the digital signal, and a baseband distortion by-product detector/sensor configured to generate distortion by-product information, and LNA dynamic information. A reinforcement learning processing circuitry receives and uses this information to perform reinforcement learning and to output control signals to the FSL and the LNA to maximize linearity, linear efficiency, and receiver sensitivity.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
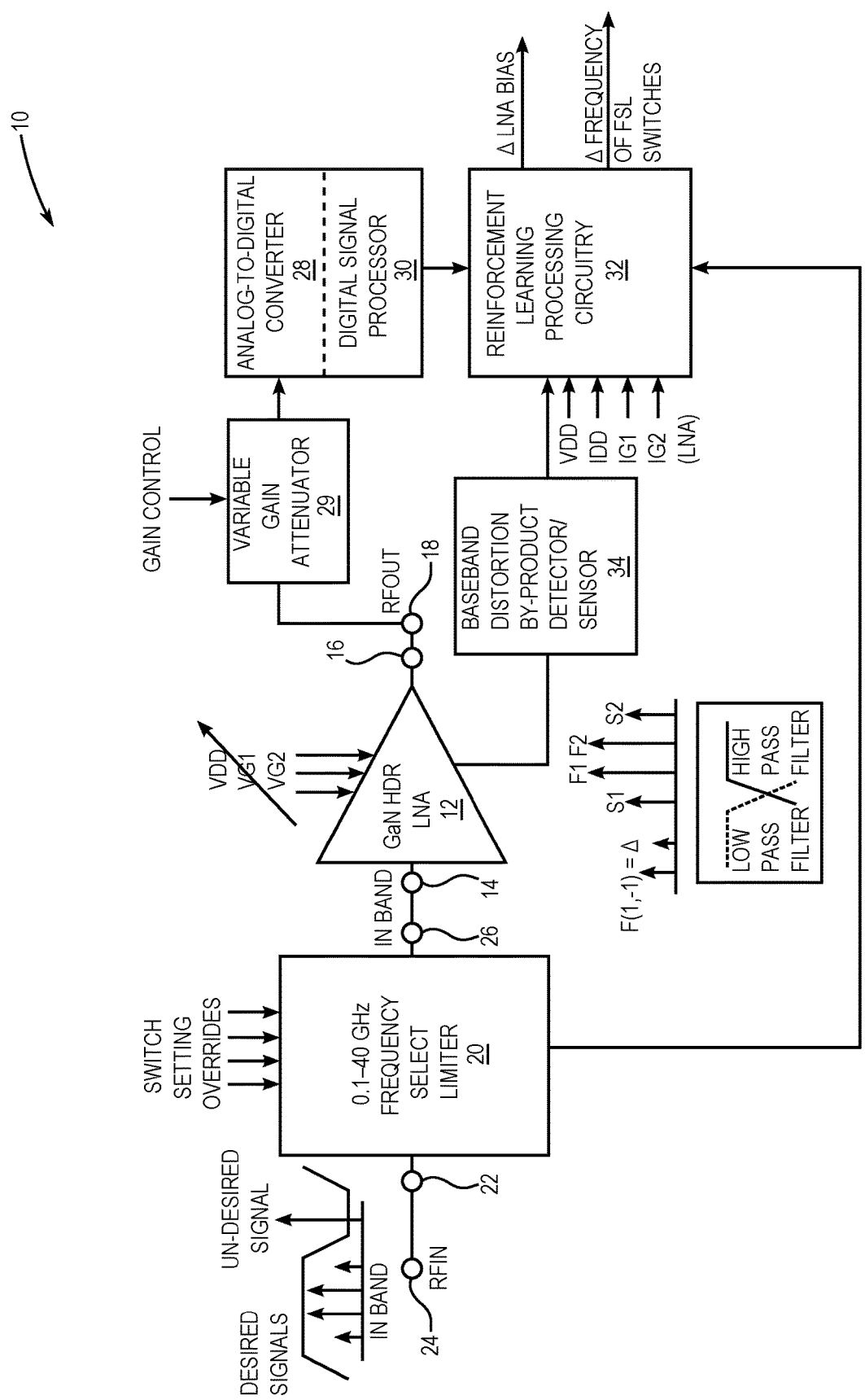
FIG. 1 is a diagram showing an embodiment of the architecture (RL-RXFE) according to the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure employs reinforcement learning to maximize the performance of a radio frequency (RF) receiver in a wireless communication device. Reinforcement learning is an area of machine learning in which agents learn to interact with their environment to maximize a certain reward. Reinforcement learning is based on the idea of trial and error, in which the agent can make decisions or take actions to receive a reward or punishment. Reinforcement learning is a type of supervised learning, in which the agent is given feedback on its decisions or actions, which can then be used to adjust its future decisions or actions.

FIG. 1 is a diagram showing an exemplary embodiment of a reinforcement learning receiver front-end (RL-RXFE) 10 according to the present disclosure. A low-noise amplifier (LNA) 12 is configured to amplify a radio frequency (RF) signal received at an amplifier input 14. The LNA 12 has an amplifier output 16 coupled to an RF output 18. In this exemplary embodiment, the LNA 12 is fabricated of gallium nitride (GaN) and is of the high-dynamic range (HDR) type. Supply voltage VDD and bias voltages VG1 and VG2 of the LNA are adjustable. The LNA 12 is configured to be bias- and frequency-reconfigurable as indicated by the variable supply voltage and variable bias voltages VG1 and VG2 provided to LNA 12. In some embodiments, the LNA 12 is configured to provide single-ended to balanced-to-unbalance conversion. In a preferred embodiment, the GaN transistor may be a stacked FET, dual-gate, or cascode topology requiring a VG1 and a separate VG2 control voltage.

A frequency selective limiter (FSL) 20 has a limiter input 22 that is coupled to an RF input 24 and a limiter output 26 that is coupled to the amplifier input 14 of the LNA 12. The FSL is configured to attenuate undesired radio frequency (RF) bands and to provide for sensing of RF band power. The FSL is power threshold (Pth) adaptive. For example, a Pth may be set equal to 15 dBm.

An analog-to-digital converter 28 is configured to receive and convert the amplified RF signal to a digital signal, and a linear variable gain/attenuator 29 is coupled between the amplifier output 16 and the analog-to-digital converter 28. The linear variable gain/attenuator 29 is configured to adjust signal level of the amplified RF signal converted to the digital signal by the analog-to-digital converter 28 to provide optimal link performance, which includes but is not limited to improved sensitivity, linearity, and dynamic operation over a wide range of power and frequency. A control signal received by the linear variable gain/attenuator 29 allows the signal level of the amplified signal to be adjusted for input into the analog-to-digital converter 28. The linear variable gain/attenuator 29 has wide bandwidth and high linearity to provide for a relatively broad range of signal levels. Additionally, some embodiments of the linear variable gain/attenuator 29 are configured to provide single-ended to differential balanced operation for differentially driving inputs of the analog-to-digital converter 28. In some embodiments, the linear variable gain/attenuator 29 is fabricated of gallium nitride or silicon on insulator or other broadband-high linearity semiconductor. In some embodiments, the linear variable gain/attenuator 29 is a fine frequency FSL is configured to generate the spectrum information with relatively finer sub-frequency with respect to the FSL coupled to the RF input, wherein the fine frequency FSL is further configured to provide dynamic attenuation to level signals transmitted to the digital signal processor.

A digital signal processor 30 is configured to receive and analyze an RF passband spectrum and generate spectrum information from the digital signal. The analog-to-digital converter 28 may be integral with the digital signal processor 30 as depicted in FIG. 1.

Reinforcement learning processing circuitry 32 is configured to receive the spectrum information from the digital signal processor 20. A baseband distortion by-product detector/sensor 34 is configured to generate distortion by-product information that is passed to and received by the reinforcement learning processing circuitry 32. LNA dynamic information that includes but is not limited to the LNA supply voltage VDD, the LNA drain current IDD, and bias currents IG1 and IG2 is also received by the reinforcement learning processing circuitry 32. FSL dynamic information includes but is not limited to indications of the FSL input and output power levels (either aggregate or per sub-band), and FSL switch settings.

The reinforcement learning processing circuitry 32 is configured to output control signals to the FSL 20 and the LNA 12 in response to the spectrum information, the distortion by-products information, FSL dynamic information, and the LNA dynamic information. The control signals generated by the reinforcement learning processing circuitry 32 of the exemplary embodiment depicted in FIG. 1 include but are not limited to an adjust (Δ) LNA bias control signal that adjusts the bias voltages VG1, VG2, and VDD, and a Δ frequency for the overriding FSL switches.

Figure 2:
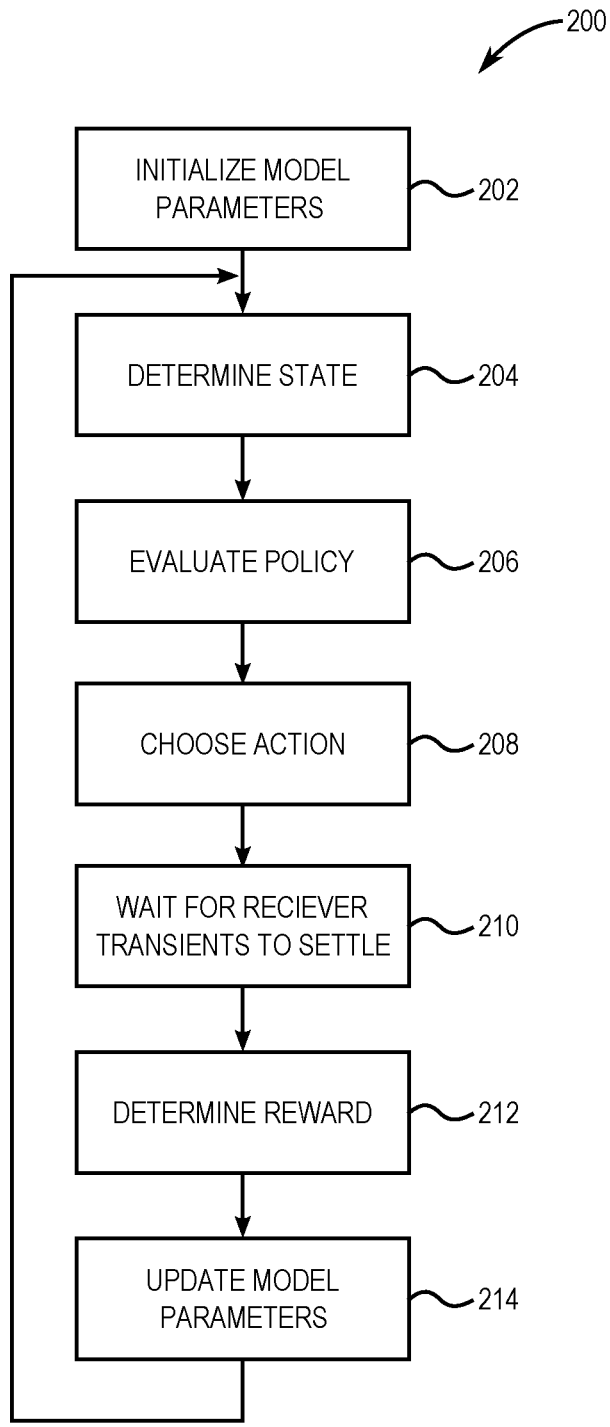
FIG. 2 is a general reinforcement learning flow diagram depicting method steps automatically performed by the RL-RXFE during operation.

FIG. 2 is a general RL flow diagram 200 showing method steps automatically executed by the reinforcement learning processing circuitry 32 during operation of the RL-RXFE 10 according to the present disclosure. Operation begins with initialization of the model parameters (step 202). The term "model" as used here refers to the policy and/or reward functions maintained by the RL agent and used to make decisions regarding settings for the LNA 12 and the FSL 20.

Initialization may be done with a preferred set of parameters or with a recently adapted set of parameters. Next, an environment state is determined (step 204). The reinforcement learning processing circuitry 32 may execute step 204 by using FSL sub-band power levels, FSL setting, LNA features such as input/output power, Idd, Ig1, Ig2 currents, and/or frequency spectrum information determined by the digital signal processor 30. Next, a policy is evaluated (step 206) and an action is chosen (step 208). The policy may be either stochastic or deterministic, and the actions may involve changing the configuration of the LNA 12 and/or the FSL 20. The reinforcement learning processing circuitry 32 then waits for a settling time after each action so that the receiver and baseband transients can settle before sensing rewards (step 210). After waiting, the reinforcement learning processing circuitry 32 determines an environmental reward (step 212). This step may be done using distortion levels such as RF third-order intermodulation products (IM3), baseband by-product distortion, and/or power consumption and/or bias voltages and currents for the LNA 12. The reinforcement learning processing circuitry 32 then updates the model parameters (step 214). The reward/policy model parameters are updated based on the received rewards and may be updated after multiple action/reward cycles.

Figure 3:
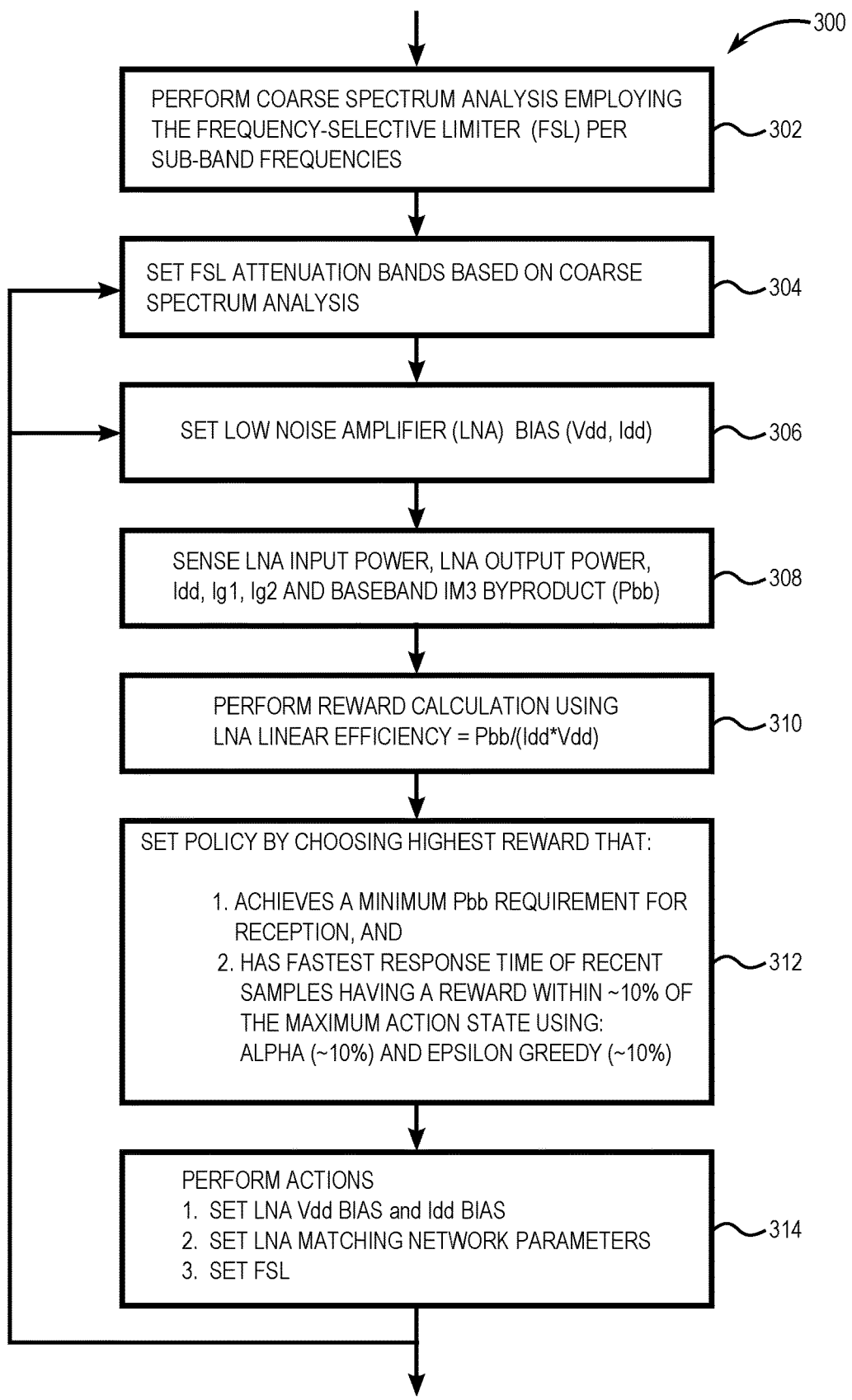
FIG. 3 is a diagram showing a detailed embodiment of the reinforcement learning method.

FIG. 3 is a flow diagram of an exemplary embodiment of an RL policy/reward method 300. This method maximizes intelligent decision making and action response time while also minimizing the bias settling response time from learning the behavior of a particular semiconductor type for the LNA 12's reaction time to the setting time of adjacent subsequent bias adjustments. This process effectively addresses the surface state effects of field-effect transistor semiconductors, such as GaN. The RL policy/reward method 300 is configured to provide the best efficiency, linearity, signal-to-noise ratio, noise factor (NF), third-order intercept point, and dynamic range, over RF received frequency, power, and other environmental conditions during LNA operation.

The reinforcement learning processing circuitry 32 executes the RL policy policy/reward method 300 to perform coarse spectrum analysis by employing the FSL 20 (FIG. 1) per sub-band frequencies of interest (step 302). The RL policy/reward method 300 then sets FSL attenuation bands based on coarse spectrum analysis (step 304). Next, the RL policy/reward method 300 sets the biases to the LNA 12 (step 306). The RL policy/reward method 300 then receives sensed LNA input power, LNA output power, drain current Idd, and bias current Ig1 and Ig2, and the baseband IM3 by-product (Pbb) (step 308). After receiving this information from the previous step, the RL policy/reward method 300 performs a reward calculation for LNA linear efficiency, which is equal to one divided by the product of Pbb multiplied by the drain current Idd multiplied by the supply voltage Vdd (step 310). Mathematically, the linear efficiency reward equals $$\frac{1}{(Pbb*Idd*Vdd)},$$

where Pbb is a measure of in-band distortion or in-band by-product distortion to be more general.

The RL policy/reward method 300 then sets policy by choosing a highest reward that achieves a minimum Pbb requirement for reception and has a fastest response time of recent samples with a reward within 10% of a maximum action state (step 312). In this exemplary embodiment, the RL agent follows an epsilon-greedy policy that selects the best action 90% of the time and randomly explores other actions 10% of the time. The best action is the one that achieves the minimum Pbb requirement for reception and has the fastest response time of all actions the expected reward of which is within 10% of the highest reward of all possible actions. The RL agent maintains a memory of previously observed rewards for each action under different conditions of the environment, as characterized by the LNA features in 308 and FSL features in 302. The RL agent's memory may be in tabular form or in the form of a model, such as a neural network. In either case, the memory represents expected rewards for each action based on the current environment features. With each new action, the agent computes an observed reward (310) and updates its memory using a learning rate of alpha=0.1. In some embodiments, the RL agent associated with the reinforcement learning updates the learning rate of alpha equal to between 0.05 to 0.15. Once the best action has been identified, the RL policy/reward method 300 returns to steps 304 and 306 to perform their respective action (step 314). These actions may be extended also to include setting LNA matching network parameters and setting the FSL to explore other frequency sub-bands as shown in step 314.

FIG. 3 is summarized by recognizing that the RL policy reward method (300) which provides receiver best performance regarding LNA NF, third-order intercept point, and linearity operation with changing RF conditions requires a sense/detection of the RF receiver input power per sub-bands as determined using coarse-discrete frequency spectrum analysis and the LNA RF input spectrum power from a coupler (not shown) at the RF input 24 (FIG. 1), for all frequencies during operation. The LNA baseband distortion by-products Pbb should be detected, and a low-pass filter pole should be set higher than a desired communication modulation bandwidth. Power detection or envelope detect baseband distortion by-product spectrum that is correlated to RF distortion and LNA amplified RF passband spectrum from baseband to RF at LNA RF output 18 should be obtained, as well as Idd, Ig1, and Ig2 for a cascode field-effect transistor LNA employed in some embodiments. The LNA linear efficiency reward calculation should use the baseband detection and low-pass filter that passes a pole-modulated bandwidth communication signal and baseband IM3 by-product Pbb(f2−f1) measured in decibel-milliwatts. The reward should be calculated as a linear efficiency metric, or 1/(Pbb(f2−f1)*(Idd*Vdd)).

The policy for choosing the highest efficiency reward-action (Vdd, Idd) is initially to set the LNA at a low NF bias (Vdd, Idd) to achieve the minimum Pbb (IM3_dBc linearity). The policy should also have the quickest re-bias response time from existing settings (lookup table calibration) for best reward-actions that are within 10% of the maximum value of recent trials/samples/epochs. The actions include setting Vdd and Idd bias and setting the LNA band tunable network (optionally, the LNA matching network can be tuned for RF performance within the native broad bandwidth). Additionally, FSL attenuation bands can be set (optionally, exploring additional FSL states/notches to optimize can be explored). Moreover, in some embodiments, the reinforcement learning circuitry is configured to calculate a reward metric that is inversely proportional to LNA distortion and inversely proportional to LNA bias power to maximize LNA linearity and efficiency.

The RL-RXFE 10 learns a reconfiguration policy that is generated in real time to best balance LNA linearity and power consumption, and rewards measured from each action are used to adapt the policy in non-stationary environments. As such, the present disclosure offers many advantages over traditional receiver front-ends. These advantages include but are limited to improved receiver and LNA efficient operation in a wide range of environmental conditions. This includes extreme cases such as large co-site interferers, hostile jammers, or multi-path. Furthermore, the architecture allows for autonomous operation and self-optimization relative to process variations. Initial simulations have shown that the reward/policy models are sensitive to the amount of exploration, and ongoing work includes identifying reward/policy models that are well-suited for RL-RXFE applications. Additionally, reconfiguration rewards have been observed to depend on the frequency content of the received signal and the power level, which can be improved by the use of the FSL and digital signal processor.

Figure 4:
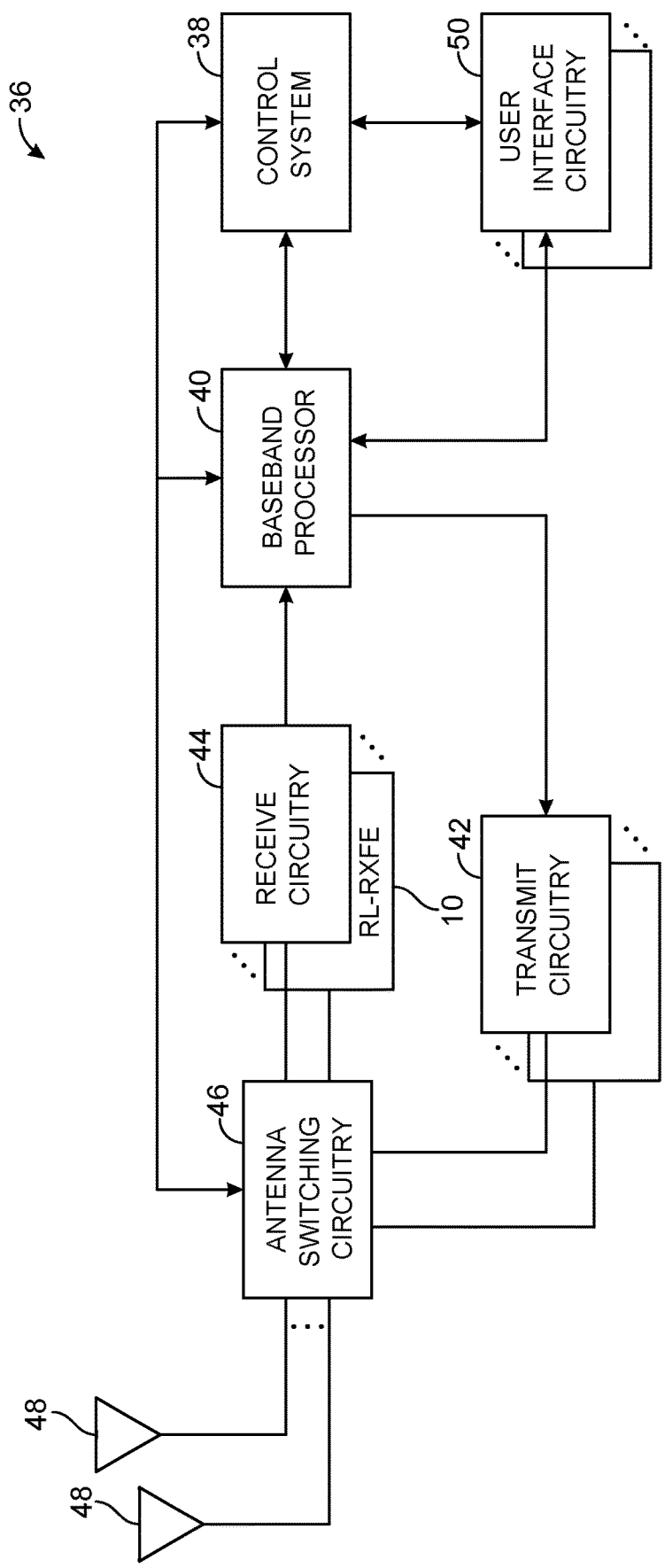
FIG. 4 is a diagram showing how the disclosed RL-RXFE may interact with user elements such as wireless communication devices.

With reference to FIG. 4, the concepts described above may be implemented in various types of wireless communication devices or user elements 36, such as mobile terminals, smart watches, tablets, computers, navigation devices, access points, and the like that support wireless communications, such as cellular, wireless local area network (WLAN), Bluetooth, and near-field communications. The user elements 36 will generally include a control system 38, a baseband processor 40, transmit circuitry 42, receive circuitry 44 that includes the RL-RXFE 10 (FIG. 1), antenna switching circuitry 46, multiple antennas 48, and user interface circuitry 50. The receive circuitry 44 receives radio frequency signals via the antennas 48 and through the antenna switching circuitry 46 from one or more basestations. A LNA and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams.

The baseband processor 40 processes the digitized received signal to extract the information or data bits conveyed in the received signal. This processing typically comprises demodulation, decoding, and error correction operations. The baseband processor 40 is generally implemented in one or more digital signal processors and application-specific integrated circuits.

For transmission, the baseband processor 40 receives digitized data, which may represent voice, data, or control information, from the control system 38, which it encodes for transmission. The encoded data is output to the transmit circuitry 42, where it is used by a modulator to modulate a carrier signal that is at a desired transmit frequency or frequencies. A power amplifier will amplify the modulated carrier signal to a level appropriate for transmission and deliver the modulated carrier signal to the antennas 48 through the antenna switching circuitry 46. The antennas 48 and the replicated transmit and receive circuitries 42, 44 may provide spatial diversity. Modulation and processing details will be understood by those skilled in the art.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A reinforcement learning reconfigurable receiver front-end (RL-RXFE) comprising:
a low-noise amplifier (LNA) having an amplifier input and an amplifier output, wherein the LNA is configured to respond to adjustable supply voltage VDD and bias voltages; and
reinforcement learning processing circuitry configured to receive spectrum information from an LNA-input detection node coupled to the amplifier input, spectrum information from an LNA-output detection node coupled to the amplifier output, distortion by-product information generated by a baseband distortion by-product detector/sensor, and LNA dynamic information, wherein the reinforcement learning processing circuitry is configured both to perform reinforcement learning and to generate control signals received by the LNA in response to the spectrum information, the distortion by-products information, and the LNA dynamic information.

2. The RL-RXFE of claim 1 wherein the reinforcement learning processing circuitry is configured to further perform reinforcement learning in response to an efficiency reward to generate the control signals.

3. The RL-RXFE of claim 2 wherein an RL agent associated with the reinforcement learning follows an epsilon-greedy policy that selects the best action 90% of the time and randomly explores other actions 10% of the time.

4. The RL-RXFE of claim 2 wherein an RL agent associated with the reinforcement learning updates a learning rate of alpha equal to between 0.05 to 0.15.

5. The RL-RXFE of claim 1 further comprising a frequency selective limiter (FSL) having a limiter input coupled to a radio frequency (RF) input and a limiter output coupled to the amplifier input of the LNA, wherein the FSL is configured to respond to frequency band changing signals to attenuate undesired RF bands and for sensing RF band power, and wherein the reinforcement learning processing circuitry is further configured to further perform both reinforcement learning and control signal generation in response to FSL dynamic information associated with the FSL.

6. The RL-RXFE of claim 5 wherein the FSL is further configured to perform spectral sensing and in response to generate the spectrum information received by the reinforcement learning process circuitry to control VDD, VG1 and VG2 of the LNA and thereby reduce latency and provide relatively greater accuracy of maximized efficiency control.

7. The RL-RXFE of claim 5 further comprising:
an analog-to-digital converter configured to receive and convert an amplified RF signal to a digital signal; and
a digital signal processor configured to receive and analyze an RF passband spectrum and to generate the spectrum information from the digital signal.

8. The RL-RXFE of claim 7 wherein the reinforcement learning processing circuitry is configured to receive the spectrum information from the digital signal processor.

9. The RL-RXFE of claim 7 further comprising a linear variable gain/attenuator coupled between the amplifier output and the analog-to-digital converter, wherein the linear variable gain/attenuator is configured to adjust signal level of the amplified RF signal to be converted to the digital signal by the analog-to-digital converter.

10. The RL-RXFE of claim 9 wherein the linear variable gain/attenuator is fabricated of a broadband-high linearity semiconductor.

11. The RL-RXFE of claim 10 wherein the broadband-high linearity semiconductor is gallium nitride.

12. The RL-RXFE of claim 10 wherein the broadband-high linearity semiconductor is gallium nitride silicon on insulator.

13. The RL-RXFE of claim 5 further comprising:
a fine frequency FSL coupled to the output of the LNA and configured to generate the spectral information provided to the reinforcement learning processing circuitry; and
a digital signal processor configured to receive and analyze an RF passband spectrum and to generate the spectrum information from the digital signal.

14. The RL-RXFE of claim 13 wherein the fine frequency FSL is configured to generate the spectrum information with relatively finer sub-frequency with respect to the FSL coupled to the RF input, wherein the fine frequency FSL is further configured to provide dynamic attenuation to level signals transmitted to a digital signal processor.

15. The RL-RXFE of claim 5 wherein the FSL is further configured to adjust signal level of the RF signal before the RF signal is amplified by the LNA.

16. The RL-RXFE of claim 1 wherein the LNA dynamic information comprises LNA supply voltage level, LNA drain current level, and LNA bias current levels.

17. The RL-RXFE of claim 1 wherein the LNA is configured to provide single-ended to balanced-to-unbalance conversion.

18. The RL-RXFE of claim 1 wherein the LNA is gallium nitride silicon on insulator.

19. The RL-RXFE of claim 1 wherein the reinforcement learning process circuitry is configured to calculate a reward metric that is inversely proportional to LNA distortion and inversely proportional to LNA bias power to maximize LNA linearity and efficiency.

20. A method of configuring a reinforcement learning reconfigurable receiver front-end (RL-RXFE) comprising a low-noise amplifier (LNA), a frequency selective limiter (FSL), an analog-to-digital converter, a digital signal processor, and reinforcement learning processing circuitry, the method comprising:
receiving a radio frequency (RF) passband spectrum and generating spectrum information from a digital signal;
receiving distortion by-product information generated by a baseband distortion by-product detector/sensor, FSL dynamic information, and LNA dynamic information; and
performing reinforcement learning and outputting control signals to the FSL and the LNA in response to the spectrum information, the distortion by-products information, and the LNA dynamic information.

21. The method of configuring the RL-RXFE of claim 20 wherein the LNA dynamic information comprises LNA supply voltage level, LNA drain current level, and LNA bias current levels.

22. The method of configuring the RL-RXFE of claim 20 further comprising adjusting signal level of a RF signal by way of the FSL before the RF signal is amplified by the LNA.

23. The method of configuring the RL-RXFE of claim 20 further comprising adjusting signal level of an amplified RF signal by way of a linear variable gain/attenuator coupled between the LNA and the analog-to-digital converter.

24. The method of configuring the RL-RXFE of claim 20 further comprising calculating a reward metric that is inversely proportional to LNA distortion and inversely proportional to LNA bias power to maximize LNA linearity and efficiency.

25. A wireless communication device comprising:
a reinforcement learning reconfigurable receiver front-end (RL-RXFE) comprising:
a low-noise amplifier (LNA) having an amplifier input and an amplifier output, wherein the LNA is configured to respond to adjustable supply voltage VDD and bias voltages;
reinforcement learning processing circuitry configured to receive spectrum information from a digital signal processor, distortion by-product information generated by a baseband distortion by-product detector/sensor, frequency selective limiter (FSL) dynamic information, and LNA dynamic information, wherein the reinforcement learning processing circuitry is configured both to perform reinforcement learning and to generate control signals received by a FSL and the LNA in response to the spectrum information, the distortion by-products information, and the LNA dynamic information; and
a baseband processor configured to process a digitized version of radio frequency (RF) signals received by receive circuitry and to extract information or data bits conveyed in the received RF signal.

26. The wireless communication device of claim 25 wherein the reinforcement learning processing circuitry is configured to further perform reinforcement learning in response to an efficiency reward to generate the control signals.

27. The wireless communication device of claim 26 wherein an RL agent associated with the reinforcement learning follows an epsilon-greedy policy that selects the best action 90% of the time and randomly explores other actions 10% of the time.

28. The wireless communication device of claim 26 wherein an RL agent associated with the reinforcement learning updates a learning rate of alpha equal to between 0.05 to 0.15.

29. The wireless communication device of claim 25 further comprising the frequency selective limiter (FSL) having a limiter input coupled to an RF input and a limiter output coupled to the amplifier input of the LNA, wherein the FSL is configured to respond to frequency band changing signals to attenuate undesired RF bands and for sensing RF band power, and wherein the reinforcement learning processing circuitry is further configured to further perform both reinforcement learning and control signal generation in response to the FSL dynamic information associated with the FSL.

30. The wireless communication device of claim 29 wherein the FSL is further configured to perform spectral sensing and in response to generate the spectrum information received by the reinforcement learning process circuitry to control VDD, VG1 and VG2 of the LNA and thereby reduce latency and provide relatively greater accuracy of maximized efficiency control.

31. The wireless communication device of claim 29 further comprising:
an analog-to-digital converter configured to receive and convert an amplified RF signal to a digital signal; and
a digital signal processor configured to receive and analyze an RF passband spectrum and to generate the spectrum information from the digital signal.

32. The wireless communication device of claim 31 wherein the reinforcement learning processing circuitry is configured to receive the spectrum information from the digital signal processor.

33. The wireless communication device of claim 31 further comprising a linear variable gain/attenuator coupled between the amplifier output and the analog-to-digital converter, wherein the linear variable gain/attenuator is configured to adjust signal level of the amplified RF signal to be converted to the digital signal by the analog-to-digital converter.

34. The wireless communication device of claim 33 wherein the linear variable gain/attenuator is fabricated of a broadband-high linearity semiconductor.

35. The wireless communication device of claim 34 wherein the broadband-high linearity semiconductor is gallium nitride.

36. The wireless communication device of claim 34 wherein the broadband-high linearity semiconductor is gallium nitride silicon on insulator.

37. The wireless communication device of claim 29 further comprising:
a fine frequency FSL coupled to the output of the LNA and configured to generate the spectrum information provided to the reinforcement learning processing circuitry; and
the digital signal processor configured to receive and analyze an RF passband spectrum and to generate the spectrum information from a digital signal.

38. The wireless communication device of claim 33 wherein the fine frequency FSL is configured to generate the spectrum information with relatively finer sub-frequency with respect to the FSL coupled to the RF input, wherein the fine frequency FSL is further configured to provide dynamic attenuation to level signals transmitted to the digital signal processor.

39. The wireless communication device of claim 25 wherein the FSL is further configured to adjust signal level of the RF signal before the RF signal is amplified by the LNA.

40. The wireless communication device of claim 25 wherein the LNA dynamic information comprises LNA supply voltage level, LNA drain current level, and LNA bias current levels.

41. The wireless communication device of claim 25 wherein the LNA is configured to provide single-ended to balanced-to-unbalance conversion.

42. The wireless communication device of claim 25 wherein the reinforcement learning processing circuitry is configured to calculate a reward metric that is inversely proportional to LNA distortion and inversely proportional to LNA bias power to maximize LNA linearity and efficiency.

* * * * *